(12) United States Patent
Liu

(10) Patent No.: US 7,505,682 B2
(45) Date of Patent: Mar. 17, 2009

(54) POP-UP FLASH UNIT FOR CAMERA

(75) Inventor: Ying-Fa Liu, Dong-Guan (CN)

(73) Assignee: Asia Optical Co., Inc, Taichung (TW)

( * ) Notice: Subject to any disclaimer, the term of this patent is extended or adjusted under 35 U.S.C. 154(b) by 610 days.

(21) Appl. No.: 11/152,203

(22) Filed: Jun. 15, 2005

(65) Prior Publication Data

US 2006/0072916 A1    Apr. 6, 2006

(30) Foreign Application Priority Data

Oct. 1, 2004    (TW) .............................. 93129742 A

(51) Int. Cl.
*G03B 15/03* (2006.01)
(52) U.S. Cl. ...................... 396/177; 348/371
(58) Field of Classification Search ................. 396/177, 396/178, 176; 348/371
See application file for complete search history.

(56) References Cited

U.S. PATENT DOCUMENTS

| | | | |
|---|---|---|---|
| 4,910,542 A * | 3/1990 | Yamamoto et al. ......... 396/165 |
| 5,066,967 A | 11/1991 | Yamamoto et al. | |
| 5,930,534 A | 7/1999 | Stephenson | |
| 6,104,882 A | 8/2000 | Inazuka | |
| 6,351,609 B1 * | 2/2002 | Hosokawa et al. .......... 396/177 |
| 6,606,459 B2 * | 8/2003 | Kobayashi ................. 396/177 |
| 2002/0122666 A1 * | 9/2002 | Miyazaki et al. ............ 396/178 |
| 2004/0228624 A1 * | 11/2004 | Hsien et al. ................. 396/176 |

\* cited by examiner

*Primary Examiner*—Melissa J Koval
*Assistant Examiner*—Fang-Chi Chang

(57) ABSTRACT

A pop-up flash unit (2) for a camera includes a mounting seat (30) disposed in the camera body, a flash member (20) rotatably mounted on the mounting seat between a projected position for operating and a retracted position for storage, a driving device (40) substantially disposed in the camera body for permitting movement of the flash member from the retracted position to the projected position, a pair of first torsion members (34, 35) for providing a resilient restoring force to the flash member to thereby permit movement of the flash member from the retracted position to the projected position, and a second torsion member (45) for reliably retaining the flash member in the retracted position. The flash member is retained in its retracted position via a latching engagement with the driving device.

21 Claims, 5 Drawing Sheets

POP-UP FLASH UNIT FOR CAMERA

BACKGROUND OF THE INVENTION

1. Field of the Invention

The present invention relates to a flash unit for a camera, and particularly relates to a pop-up flash unit for a camera that is movable between a projected position and a retracted position.

2. Description of Prior Art

Flash units for providing artificial illumination during photographic exposures under conditions of low ambient scene light intensity are well known in the art. However, with more recent cameras that have a large sized taking lens to achieve a high zoom ratio, a built-in unit is generally insufficient to meet the performance requirements. Furthermore, since electronic viewfinders (EVF) are increasingly incorporated in cameras instead of standard optical viewfinders (OVF), the camera design correspondingly becomes increasingly compact, which results in limited interior space available in the camera. In addition, with the current trend of cameras toward compactness, the relative closeness of the flash unit and the taking lens can cause an undesirable phenomenon known as "red-eye" to occur. This effect causes the pupils of the eyes of a person being photographed to appear as red dots in a print made from the color negative. Accordingly, to save the interior space of the camera and to reduce the occurrence of red-eye during flash picture-taking, a pop-up flash unit is desired that is pivotally connected to the body housing of the camera to be popped up from the body housing for use and popped down for storage. When popped up, the pop-up flash unit increases the flash-to-lens distance and therefore makes red-eye phenomenon less likely to occur. The pop-up flash unit is manually raised or automatically rises from the camera body when needed.

Various pop-up flash units have conventionally been proposed.

For example, in U.S. Pat. No. 5,930,534, a pop-up flash unit is disclosed that is pivotally connected to the camera body housing. The camera body housing has a protruding portion that forms a film roll chamber, and the pop-up flash unit has a flash housing defining a cavity for receiving the protruding portion when the pop-up flash unit is popped down to the body housing, thereby integrating the flash housing with the body housing. Such a pop-up flash unit occupies a large space and significantly increases the longitudinal dimension of the camera, which deviates from the current compact trend.

U.S. Pat. No. 5,066,967 discloses a pop-up flash unit that is retained by engagement in the state of being urged in a pop-up direction, and for a pop-up operation, the flash unit is released from the retention by engagement by means of an electromagnet. Such a conventional pop-up flash unit, however, has a number of disadvantages. For example, since a dedicated actuator such as the electromagnet is needed for initiating the pop-up operation of the flash unit, an increase in cost cannot be avoided and the mechanism cannot be simplified. Also, if a flash zooming mechanism is to be added, an additional motor or the like is needed and the size of the camera increases.

U.S. Pat. No. 6,104,882 discloses a pop-up flash unit that has a flash-light emitting block connected to the camera body through a pair of linking mechanisms. Each of the linking mechanisms is composed of a primary lever, an L-shaped lever and a C-shaped lever. The flash-light emitting block is moved up and down through pivots provided thereon when the pair of primary levers swings. During this swinging movement of the pair of primary levers, the position and posture of the flash-light emitting block are controlled by the pair of L-shaped levers and the pair of C-shaped levers. Since such a linking mechanism is provided with a plurality of levers and pivots that are very complex in their movements, malfunctions may occur or the levers may get stuck during movement between the projected position and the retracted position.

Accordingly, an improved pop-up flash unit is desired to overcome the above-mentioned disadvantages in prior art.

SUMMARY OF THE INVENTION

One object of the present invention is to provide a pop-up flash unit for a camera that has a simple structure.

Another object of the present invention is to provide a pop-up flash unit for a camera in which each inside element thereof is space-efficiently arranged to miniaturize the camera size.

A further object of the present invention is to provide a pop-up flash unit for a camera in which the casing of the flash unit is movably connected to the camera body through a simple, reliable and strong driving and retaining mechanism.

To achieve the above objects of the present invention, a pop-up flash unit for a camera in accordance with the present invention comprises a mounting seat disposed in the camera body, a flash member rotatably mounted on the mounting seat between a projected position for operating and a retracted position for storage, a driving device substantially disposed in the camera body for permitting movement of the flash member from the retracted position to the projected position, a pair of first torsion members for providing a resilient restoring force to the flash member to thereby permit movement of the flash member from the retracted position to the projected position, and a second torsion member for reliably retaining the flash member in the retracted position. The flash member is retained in its retracted position via a latching engagement with the driving device.

The mounting seat has a pair of side arms defining a space therebetween for receiving an electronic viewfinder therein, and a pivot pin supported between upper portions of the side arms. The flash member includes a casing and a flash lens received in the casing. The casing is composed of an upper cover and a lower cover having a downwardly projecting latching portion. The lower cover has a pair of mounting portions each of which has a through hole for allowing extension of one end portion of the pivot pin, a cutout in communication with the through hole, and a projection formed adjacent to the cutout. The pair of first torsion members is preferably a pair of torsion coil springs wound around opposite end portions of the pivot pin. Each torsion coil spring has one end engaged in an engaging slot defined in a side edge of each side arm of the mounting seat, and the other end extending through the cutout of a corresponding mounting portion of the lower cover to engage with the projection. The body of each torsion coil spring is received in a corresponding cutout.

The driving device includes a rotation member, a push button outwardly projecting from the camera body for allowing an external force to be exerted thereon, a push bar disposed between the rotation member and the push button for transmitting the external force to the rotation member, and a coil compression spring wound around the push bar for providing a restoring force to the push button. The rotation member has a body with the second torsion member, in the form of a torsion coil spring, wound around one end portion thereof, and a latching arm upwardly projecting from the body for latching with the downwardly projecting latching portion of the flash member whereby the flash member is held in the retracted position.

BRIEF DESCRIPTION OF THE DRAWINGS

The present invention may best be understood through the following description with reference to the accompanying drawings, in which.

DETAILED DESCRIPTION OF THE INVENTION

Figure 1A:
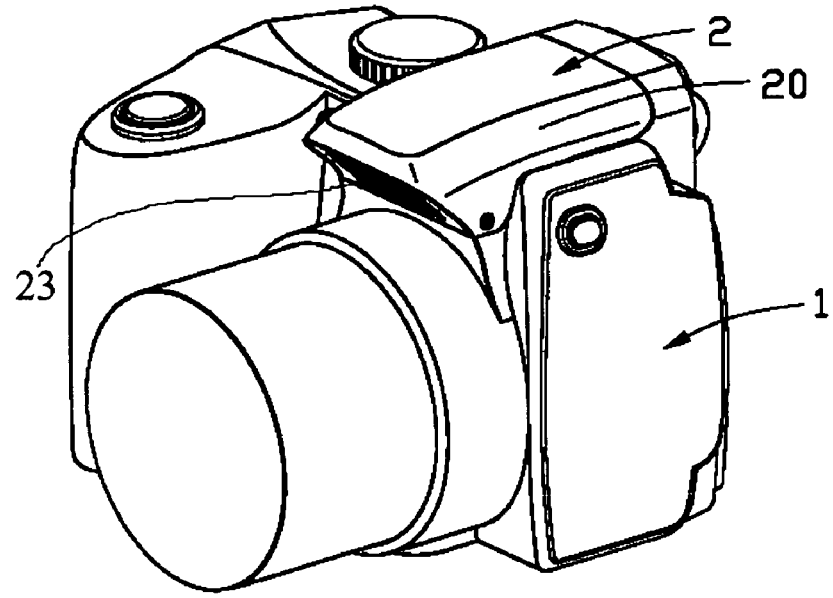
FIG. 1A is a perspective view of a camera with a pop-up flash unit in accordance with the present invention mounted thereon, the pop-up flash unit being in a retracted position.
Figure 1B:
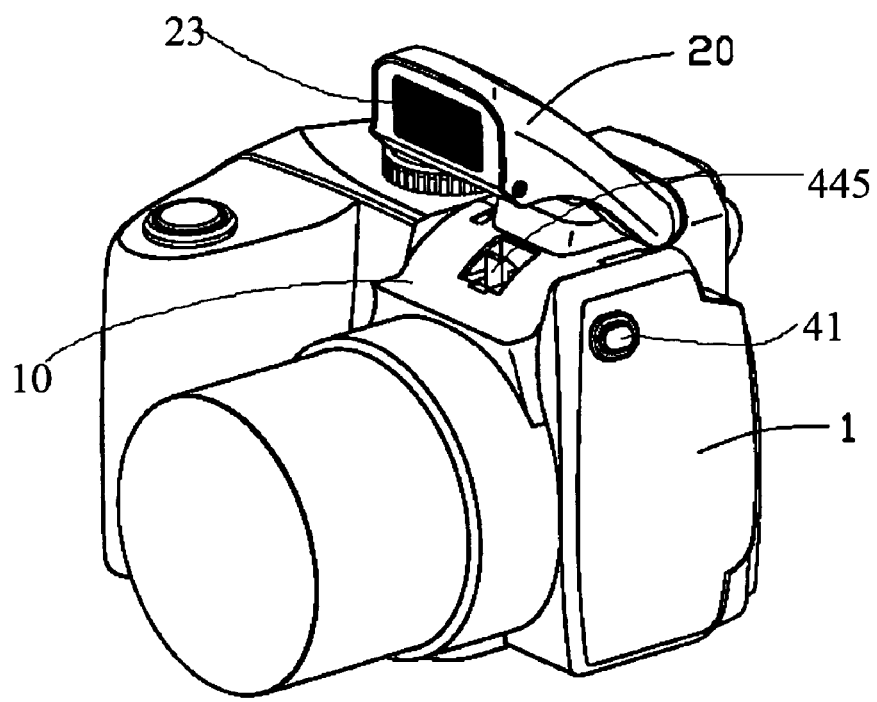
FIG. 1B is a view similar to FIG. 1, but with the pop-up flash unit in a projected position.

Referring to FIGS. 1A and 1B, a pop-up flash unit 2 in accordance with the present invention is adapted to be rotatably mounted on a photographic device body such as a digital camera body 1. The pop-up flash unit 2 is movable between a retracted position (the position shown in FIG. 1A) for storage, where a flash lens 23 thereof faces downwards, and a projected position (the position shown in FIG. 1B) for operating, where the flash lens 23 is raised into place facing a photographic object ahead of the camera.

Figure 2:
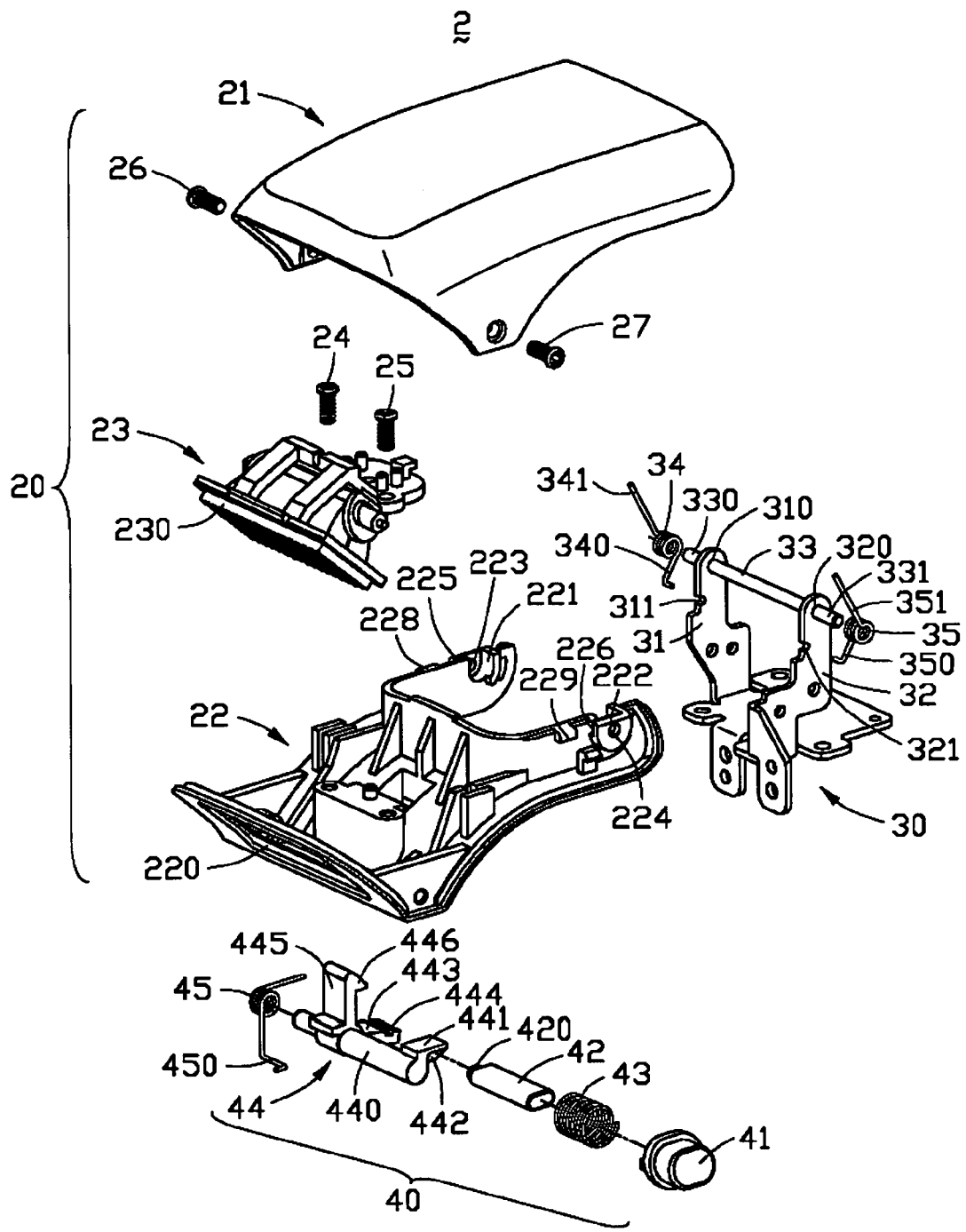
FIG. 2 is an exploded, perspective view of the pop-up flash unit in accordance with the present invention.

An exploded, perspective view of the pop-up flash unit 2 in accordance with the present invention is shown in FIG. 2. The pop-up flash unit 2 includes a flash member 20, a mounting seat 30 disposed within the camera body 1 for movably supporting the flash member 20 thereon, a driving device 40 for driving the flash member 20 from the retracted position to the projected position, a pair of first torsion members 34, 35 for providing a resilient restoring force to the flash member 20 to thereby permit movement of the flash member 20 from the retracted position to the projected position, and a second torsion member 45 for reliably retaining the flash member 20 in the retracted position.

The flash member 20 includes a flash lens 23, and an upper cover 21 and a lower cover 22 for cooperatively receiving the flash lens 23 therebetween. The flash lens 23 has a flash-light emitting portion 230 located at the frontmost position, and the lower cover 22 defines an opening 220 corresponding to the flash-light emitting portion 230 for allowing emission of the flash light therethrough. A pair of mounting portions 221, 222, in the form of a pair of mounting ears, is provided on the lower cover 22 at the rearmost position. Each mounting portion 221, 222 defines a through hole 223, 224 and a cutout 225, 226 in communication with the through hole 223, 224. A projection 228, 229 is formed on each mounting portion 221, 222 adjacent to the cutout 225, 226. The flash lens 23 is mounted on the lower cover 22 by means of two screws 24, 25 with the flash-light emitting portion 230 thereof received in the opening 220 of the lower cover 22. The upper cover 21 is assembled to the lower cover 22 by means of two screws 26, 27 to form a casing that receives the flash lens 23 therein.

The mounting seat 30 is disposed in the interior of the camera body 1 and includes a pair of side arms 31, 32 defining a pair of aligned through holes 310, 320. A horizontal pivot pin 33 is supported on the mounting seat 30 with opposite end portions 330, 331 thereof extending through the holes 310, 320. Each side arm 31, 32 further defines an engaging slot 311, 321 in a front side edge thereof. A pair of first torsion members, in the form of a pair of first torsion coil springs 34, 35, is wound around respective end portions 330, 331 of the pivot pin 33 with one end 340, 350 thereof engaged in the engaging slot 311, 321 of the side arm 31, 32 and with the other end 341, 351 thereof engaged with the projection 228, 229 of the lower cover 22.

The driving device 40 is substantially mounted within the camera body 1, and includes a push button 41 outwardly protruding from the camera body 1 for manual operation, a push bar 42, a coil compression spring 43 coiled around the push bar 42, a rotation member 44 proximate to an end portion 420 of the push bar 42, and a second torsion coil spring 45 mounted on the rotation member 44. The rotation member 44 includes a body 440 generally in the shape of a pin, an actuating arm 441 projecting outwardly from the body 440 and having an inclined contact surface 442 facing toward the end protrusion 420 of the push bar 42, a stop arm 443 projecting from the body 440 in the same direction as the actuating arm 441, and a latching arm 445 projecting upwardly from the body 440 with a latching hook 446 formed at a free end thereof. The stop arm 443 defines a slot 444 in an upper surface thereof for receiving one end 450 of the second torsion coil spring 45 therein.

Figure 3:
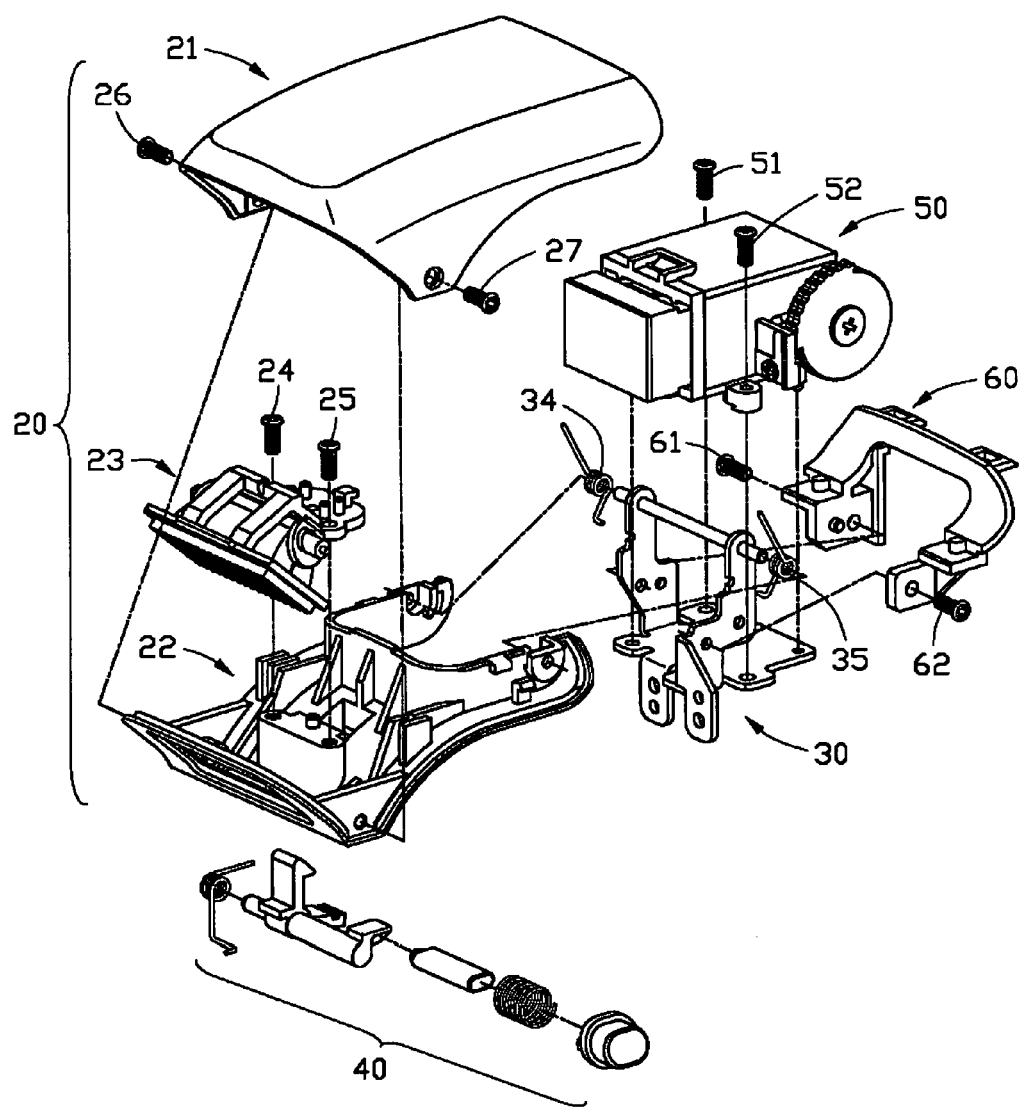
FIG. 3 is a view similar to FIG. 2, but with an electronic viewfinder incorporated therein for showing the positional relationship between the electronic viewfinder and the present pop-up flash unit.

Also referring to FIG. 3, which is a view similar to FIG. 2 but with an electronic viewfinder 50 incorporated therein for showing the positional relationship between the electronic viewfinder 50 and the present pop-up flash unit 2. The electronic viewfinder 50 is mounted on the mounting seat 30 by means of screws 51, 52 with the side arms 31, 32 of the mounting seat 30 on opposite sides thereof. A retaining member 60 is attached to the side arms 31, 32 of the mounting seat 30 with screws 61, 62, thereby reliably retaining the electronic viewfinder 50 on the mounting seat 30. The flash member 20 is rotatably mounted on opposite end portions 330, 331 of the pivot pin 33 on the mounting seat 30. In such a manner, the interior space in the camera body 1 is efficiently utilized, whereby the camera size can be reduced to comply with the compact requirement.

In assembly, the electronic viewfinder 50 is first mounted on the mounting seat 30 with the screws 51, 52, and is further retained on the mounting seat 30 by the retaining member 60 that is attached to the side arms 31, 32 of the mounting seat 30 with the screws 61, 62. The pivot pin 33 is supported on the mounting seat 30 by extending each end portion 330, 331 thereof through the through hole 310, 320 of the side arm 31, 32. The first torsion coil spring 34, 35 is coiled around a corresponding end portion 330, 331 of the pivot pin 33. The flash member 20 is then mounted on the mounting seat 30 by inserting each end portion 330, 331 of the pivot pin 33 into a corresponding through hole 223, 224 of the lower cover 22. The first torsion coil spring 34, 35 is received in the cutout 225, 226 of a corresponding mounting portion 221, 222 with one end 340, 350 thereof engaged in the engaging slot 311, 321 of a corresponding side arm 31, 32 of the mounting seat 30 and with the other end 341, 351 thereof extending through the cutout 225, 226 and engaging with the projection 228, 229 of a corresponding mounting portion 221, 222 of the lower cover 22. The upper cover 21 is attached to the lower cover 22 by the screws 26, 27 with the flash lens 23 received therebetween to constitute a flash member 20 together. The flashlight emitting portion 230 of the flash lens 23 is received in the opening 220 of the lower cover 22. The driving device 40 is disposed within the camera body 1 in a proper manner and is located below the flash member 20 adjacent to the mounting seat 30.

Figure 4:
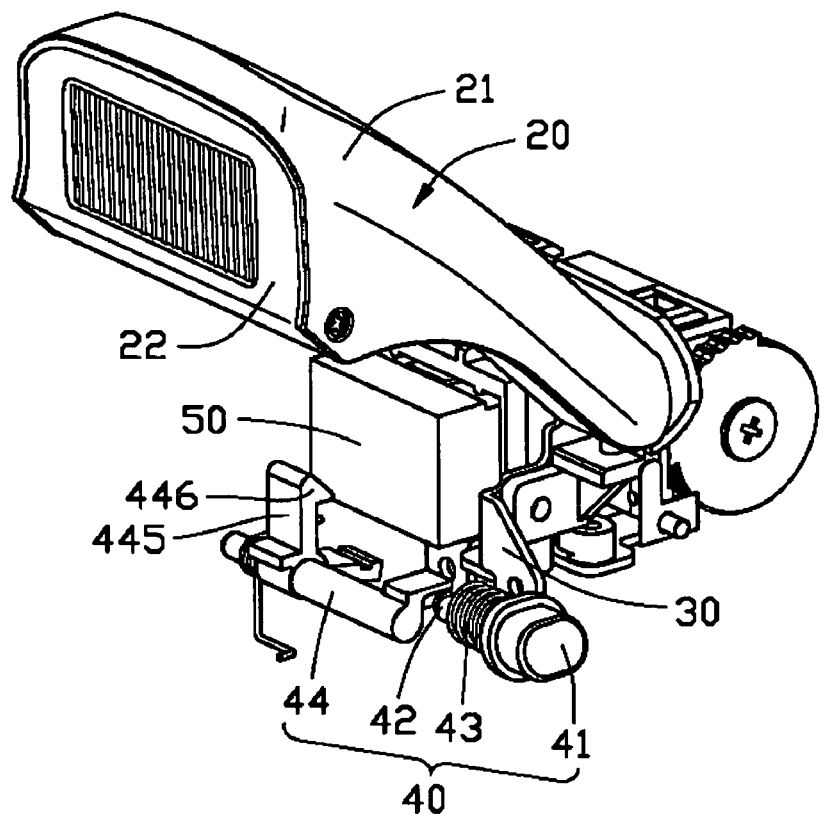
FIG. 4 is an assembled view of FIG. 3, showing the present pop-up flash unit in the projected position.
Figure 5:
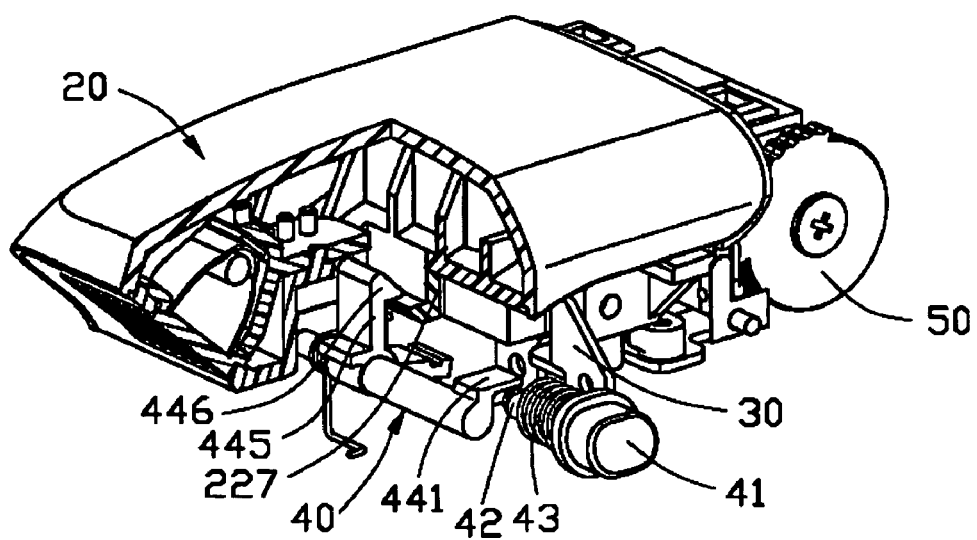
FIG. 5 is a partially cut, assembled view illustrating the latching engagement between a driving device and a flash member of the present pop-up flash unit when in the retracted position.

The assembly of the above components is shown in FIGS. 4 and 5. It can be seen that the flash member 20, the mounting seat 30, the electronic viewfinder 50 and the driving device 40 are assembled into such a compact unit that the occupied space in the camera body 1 is reduced. The pop-up and pop-down operations of the present flash unit 2 are described below in detail in reference to FIGS. 6 and 7 in conjunction with FIG. 2.

Figure 7:
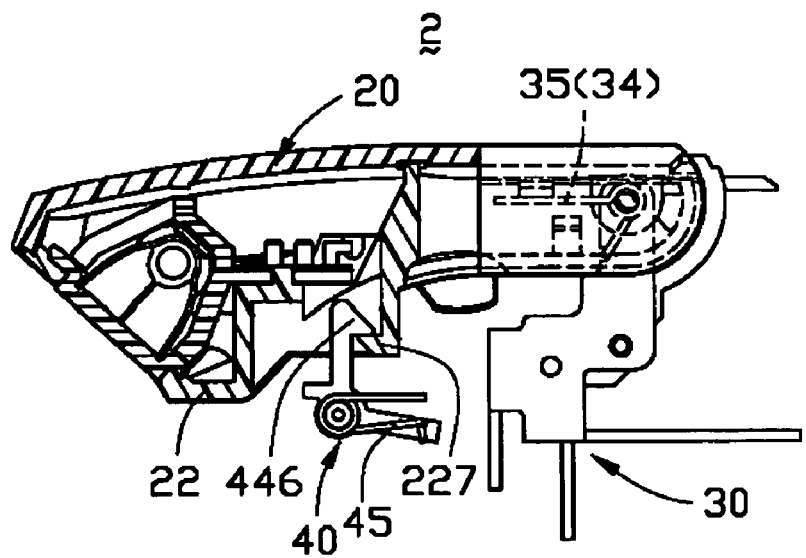
FIG. 7 is a cross-sectional schematic view showing the operation of the present pop-up flash unit for movement from the projected position to the retracted position.

FIGS. 5 and 7 illustrate the flash member 20 of the present pop-up flash unit 2 in a retracted position for storage. In this position, the first torsion coil springs 34, 35 are compressed whereby the opposite ends 340, 341; 350, 351 of the first torsion coil springs 34, 35 are urged toward each other to exert an upward spring force on the flash member 20. Accordingly, the flash member 20 has a tendency to pop up from its retracted position. The flash member 20 is brought into the retracted position by an engagement between the latching arm 445 of the driving device 40 and the latching portion 227 provided on the bottom of the lower cover 22. The second torsion coil spring 45 provides a retaining force by engaging the end 450 thereof in the slot 444 of the stop arm 443 of the driving device 40 counteract the upward spring force exerted by the first torsion coil springs 34, 35, thereby securing the engagement between the latching arm 445 and the latching portion 227 and thus reliably holding the flash member 20 in the retracted position.

When an external force is exerted on the push button 41 to depress the push button 41 toward the camera body 1, the push bar 42 is pushed forwardly and the coil compression spring 43 is simultaneously compressed. The end portion 420 of the forwardly moved push bar 42 thus pushes the inclined contact surface 442 of the rotation member 44, whereby the rotation member 44 is actuated to rotate counterclockwise and thus the latching arm 445 is moved from the normal position indicated by dashed lines to a position indicated by solid lines as in FIG. 6. Consequently, the latching hook 446 of the latching arm 445 is disengaged from the latching portion 227 on the lower cover 22, and whereby the flash member 20 is urged from the retracted position as shown in FIGS. 5 and 7 to a projected position as shown in FIGS. 4 and 6 for flash picture-taking due to resilient restoring force of the compressed first torsion coil springs 34, 35.

Figure 6:
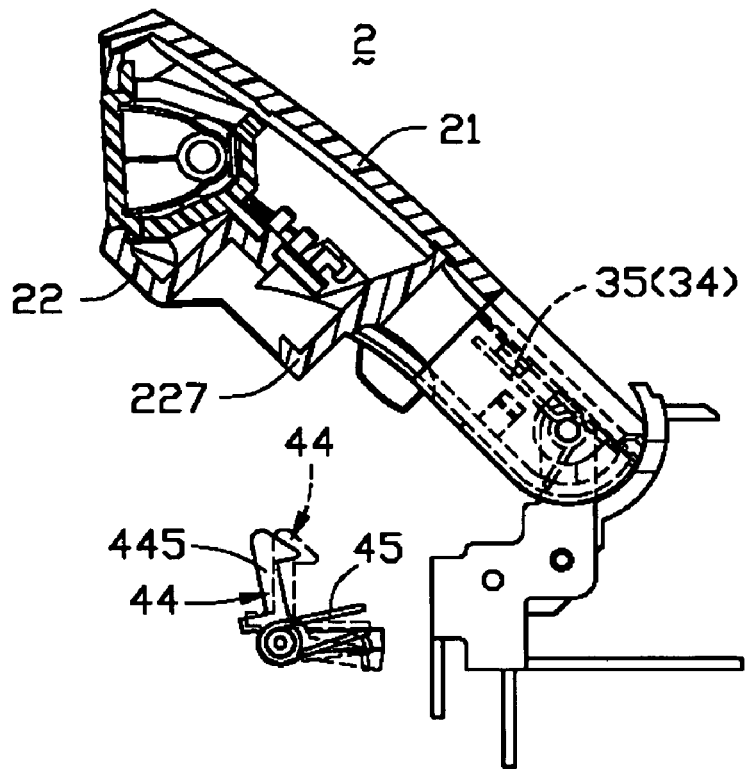
FIG. 6 is a cross-sectional schematic view showing the operation of the present pop-up flash unit for movement from the retracted position to the projected position.

When the external force is removed from the push button 41, as shown in FIG. 6, the rotation member 44 of the driving device 40 is resumed from the rotated position (indicated by solid lines) to a normal position (indicated by dashed lines) due to the provision of the second torsion coil spring 45 that has one end 450 thereof engaged in the slot 444 of the stop arm 443. In addition, the push button 41 also returns to its original projected position due to the restoring force of the compressed coil compression spring 43.

When it is desired to move the flash member 20 from the projected position to the retracted position for storage, the flash member 20 is manually depressed, whereby the first torsion coil springs 34, 35 are compressed and the latching arm 445 of the driving device 40 is urged to rotate counterclockwise when engaged with the latching portion 227 of the lower cover 22. The latching arm 445 of the driving device 40 then gradually returns to its original position by action of the second torsion coil spring 45 and is finally latched with the latching portion 227 of the lower cover 22, thereby holding the flash member 20 in the retracted position. The lower cover 22 of the flash member 20 has a bottom surface shaped according with an upper surface 10 of the camera body 1. By the rotational and latching engagement between the latching arm 445 of the driving device 40 and the latching portion 227 of the lower cover 22, the spacing between the flash member 20 and the camera body 2 in the retracted position is significantly reduced to make the camera compact.

As described above, the present pop-up flash unit 2 has a simple structure composed of a flash member 20, a mounting seat 30 and a driving device 40. The flash unit 2 is popped up into the projected, operating position by the spring force of the first torsion member 34, 35 upon manually depressing the push button 41 of the driving device 40 provided on the camera body 1. The driving device 40 and the mounting seat 30 supporting the electronic viewfinder 50 thereon are space-efficiently disposed in the camera body 1. The rotational and latching engagement between the latching arm 445 of the driving device 40 and the latching portion 227 of the lower cover 22 also contributes to the compactness of the camera employing the present pop-up flash unit 2. Further, by the provision of the mounting seat 30 and the driving device 40, the pop-up and pop-down operations of the flash unit 2 are very simple and reliable.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A pop-up flash unit for use with a photographic device, comprising:

a mounting seat adapted to be disposed in a body of the photographic device, the mounting seat having a first engaging portion and a pivot member disposed thereon;

a flash member pivotally mounted on the mounting seat about the pivot member and being movable between a projected position for operating and a retracted position for storage, the flash member including a casing and a flash lens received in the casing, the casing having a second engaging portion formed on an interior surface thereof and a latching portion outwardly projecting from an outer surface thereof;

at least one first torsion member engaged with the pivot member, said first torsion member having one end engaged with the first engaging portion of the mounting seat and the other end engaged with the second engaging portion of the flash member;

a driving device adapted to be substantially disposed in the body of the photographic device, the driving device comprising a rotation member rotatable in a first direction and a push button adapted to outwardly project from the body of the photographic device for allowing an external force to be exerted thereon in a second direction substantially parallel to the first direction, the rotation member comprising a body having an inclined contact surface for receiving and converting the external force in the second direction into rotation of the rotation member in the first direction and a latching arm projecting from the body; and a second torsion member mounted on the body of the rotation member of the driving device; wherein when the flash member is in the retracted position, the latching arm on the rotation member of the driving device is latched with the latching portion on the casing of the flash member, and the second torsion member provides a retaining force to secure the latching engagement between the latching arm of the driving device and the latching portion of the flash member; and when the push button of the driving device is depressed by the effect of the external force, the rotation member of the driving device responsively rotates in the first direction to disengage the latching arm of the rotation member from the latching portion of the flash member, and said first torsion member provides a resilient restoring force to the flash member to thereby permit the movement of the flash member from the retracted position to the projected position.

2. The pop-up flash unit as claimed in claim 1, wherein the mounting seat has a pair of side arms each defining a through hole for extension of a corresponding end portion of the pivot member therethrough.

3. The pop-up flash unit as claimed in claim 2, wherein the casing of the flash member is composed of an upper cover and a lower cover, the lower cover having a pair of mounting portions pivotably mounted on respective end portions of the pivot member.

4. The pop-up flash unit as claimed in claim 3, wherein the latching portion is provided on the bottom of the lower cover of the flash member.

5. The pop-up flash unit as claimed in claim 3, wherein the first engaging portion is an engaging slot defined in a side edge of at least one side arm of the mounting seat, and the second engaging portion is a projection formed on at least one mounting portion of the lower cover of the flash member.

6. The pop-up flash unit as claimed in claim 5, wherein each mounting portion of the lower cover of the flash member further comprises a through hole for extension of a corresponding end portion of the pivot member therethrough, and a cutout in communication with the through hole for receiving a body of a corresponding torsion member therein and for allowing one end of the corresponding torsion member extending therethrough to engage with a corresponding projection.

7. The pop-up flash unit as claimed in claim 1, wherein the second torsion member is wound around one end portion of the body of the rotation member of the driving device, and the rotation member of the driving device further has a stop arm projecting from the body in a direction different from that of the latching arm, the stop arm defining a slot for receiving one end of the second torsion member therein.

8. The pop-up flash unit as claimed in claim 7, wherein the rotation member of the driving device further has an actuating arm projecting from the body in the same direction as the stop arm and forming the inclined contact surface thereon.

9. The pop-up flash unit as claimed in claim 1, wherein the driving device further comprises a push bar disposed between the rotation member and the push button for transmitting the external force to the rotation member, and a coil compression spring wound around the push bar for providing a restoring force to the push button.

10. The pop-up flash unit as claimed in claim 9, wherein the contact surface of the rotation member of the driving device is an inclined surface, and the push bar of the driving device has a protrusion for engaging with the contact surface of the rotation member.

11. A combination of a pop-up flash unit and a viewfinder for use with a photographic device, comprising:

a mounting seat having a pair of side arms defining a space therebetween and a pivot member supported between upper portions of the pair of side arms;

a viewfinder received in the space defined the side arms of the mounting seat, the side arms of the mounting seat being located on opposite sides of and generally facing the viewfinder;

a flash member including a casing and a flash lens received in the casing, the casing being rotationally mounted on the pivot member whereby the flash member is movable between a projected position for operating and a retracted position for storage, the casing having a latching portion outwardly projecting therefrom;

at least one first torsion member disposed on the pivot member, said first torsion member having one end engaged with said side arm of the mounting seat and the other end engaged with the casing of the flash member;

a driving device comprising a rotation member rotatable in a first direction and a push button for allowing an external force to be exerted thereon, in a second direction substantially parallel to the first direction, the rotation member comprising a body having an inclined contact surface for receiving and converting the external force in the second direction into rotation of the rotation member in the first direction and a latching arm projecting from the body; and a second torsion member mounted on the body of the rotation member of the driving device; wherein when the flash member is in the retracted position, the latching arm on the rotation member of the driving device is latched with the latching portion on the casing of the flash member, and the second torsion member provides a retaining force to secure the latching engagement between the latching arm of the driving device and the latching portion of the flash member; and when the push button of the driving device is depressed by the effect of the external force, the rotation member of the driving device responsively rotates in a predetermined direction to disengage the latching arm of the rotation member from the latching portion of the flash member, and said first torsion member provides a resilient restoring force to the flash member to thereby permit the movement of the flash member from the retracted position to the projected position.

12. The combination as claimed in claim 11, wherein the casing of the flash member is composed of an upper cover and a lower cover, the lower cover having a pair of mounting portions pivotably mounted on respective end portions of the pivot member.

13. The combination as claimed in claim 12, wherein the latching portion is provided on the bottom of the lower cover of the flash member.

14. The combination as claimed in claim 11, wherein the second torsion member is wound around one end portion of the body of the rotation member of the driving device, and the rotation member of the driving device further has a stop arm projecting from the body in a direction different from that of the latching arm, the stop arm defining a slot for receiving one end of the second torsion member therein.

15. The combination as claimed in claim 11, wherein the driving device further comprises a push bar disposed between the rotation member and the push button for transmitting the external force to the rotation member, and a coil compression spring wound around the push bar for providing a restoring force to the push button.

16. The combination as claimed in claim 15, wherein the push bar of the driving device has a protrusion for engaging with the inclined contact surface of the rotation member.

17. The combination as claimed in claim 11, further comprising a retaining member attached to opposite side arms of the mounting seat for further retaining the viewfinder in position.

18. A pop-up flash unit for use with a photographic device, comprising:
   a mounting seat adapted to be disposed in a body of the photographic device and having a pivot member disposed thereon;
   a flash member pivotally mounted on the mounting seat about the pivot member and being movable between a projected position for operating and a retracted position for storage, the flash member including a casing and a flash lens received in the casing, the casing having a latching portion downwardly projecting from a lower surface thereof;
   a driving device adapted to be substantially disposed in the body of the photographic device, the driving device comprising a rotation member rotatable in a first direction and a push button adapted to outwardly project from the body of the photographic device for allowing an external force to be exerted thereon in a second direction substantially parallel to the first direction, the rotation member comprising a body having an inclined contact surface for receiving and converting the external force in the first direction into rotation of the rotation member in the first direction and a latching arm projecting from the body, the latching arm being upwardly exposed to the outside of the body of the photographic device for latching with the downwardly projecting latching portion of the flash member whereby the flash member is brought into the retracted position;
   at least one first torsion member engaged with the pivot member, said first torsion member having one end engaged with the mounting seat and the other end engaged with the casing of the flash member, said first torsion member providing a resilient restoring force to the flash member to thereby permit the movement of the flash member from the retracted position to the projected position in response to manual operation of the push button of the driving device; and
   a second torsion member mounted on the body of the rotation member of the driving device, the second torsion member exerting a retaining force on the rotation member for securing the latching engagement between the latching arm of the rotation member of the driving device and the latching portion of the flash member thereby reliably retaining the flash member in the retracted position.

19. The pop-up flash unit as claimed in claim 18, wherein the rotation member of the driving device further has a stop arm projecting from the body in a direction perpendicular to that of the latching arm, and the second torsion member having one end received in a slot defined in an upper surface of the stop arm.

20. The pop-up flash unit as claimed in claim 18, wherein the driving device further comprises a push bar disposed between the rotation member and the push button for transmitting the external force to the rotation member, and a coil compression spring wound around the push bar for providing a restoring force to the push button.

21. The pop-up flash unit as claimed in claim 20, wherein the push bar of the driving device has a protrusion engaging with the inclined contact surface for transmitting the external force to the rotation member.

* * * * *